(12) United States Patent
Pope

(10) Patent No.: US 7,997,595 B1
(45) Date of Patent: Aug. 16, 2011

(54) DISC GOLF CADDY

(76) Inventor: Daniel Lee Pope, Cumming, GA (US)

( * ) Notice: Subject to any disclaimer, the term of this patent is extended or adjusted under 35 U.S.C. 154(b) by 333 days.

(21) Appl. No.: 12/381,631

(22) Filed: Mar. 16, 2009

(51) Int. Cl.
B62B 1/24 (2006.01)

(52) U.S. Cl. ............... 280/47.26; 280/47.19; 280/47.35; 280/645

(58) Field of Classification Search ............ 280/30, 280/35, 37, 38, 39, 40, 42, 43.1, 43.11, 43.14, 280/43.15, 43.16, 43.24, 43.35, 47.11, 47.131, 280/47.17, 47.19, 47.24, 47.25, 47.26, 638, 280/639, 641, 645, 646, 651, 652, 654, 655, 280/655.1, DIG. 6

See application file for complete search history.

(56) References Cited

U.S. PATENT DOCUMENTS

| | | | | |
|---|---|---|---|---|
| 2,422,298 A * | 6/1947 | Freis | ............. | 280/42 |
| 2,581,417 A * | 1/1952 | Jones | ............. | 280/645 |
| 2,582,435 A * | 1/1952 | Howard | ............. | 280/648 |
| 2,676,710 A * | 4/1954 | Williamson | ............. | 211/70.2 |
| 2,784,004 A * | 3/1957 | Hamrick, Jr. | ............. | 280/30 |
| 2,854,244 A * | 9/1958 | Jarman | ............. | 280/47.26 |
| 2,957,700 A * | 10/1960 | Beaurline | ............. | 280/47.19 |
| 3,052,484 A * | 9/1962 | Huffman et al. | ............. | 280/654 |
| 3,121,963 A * | 2/1964 | Nolan | ............. | 37/265 |
| 3,162,461 A * | 12/1964 | Krell | ............. | 280/47.19 |
| 3,506,280 A * | 4/1970 | Coupe | ............. | 280/47.19 |
| 3,647,238 A * | 3/1972 | Mackey | ............. | 280/47.29 |
| 3,947,054 A * | 3/1976 | Hall | ............. | 280/645 |
| 4,262,928 A * | 4/1981 | Leitzel | ............. | 280/645 |
| 4,460,188 A * | 7/1984 | Maloof | ............. | 280/30 |
| 4,615,406 A * | 10/1986 | Bottenschein et al. | ...... | 180/19.1 |
| 4,846,486 A * | 7/1989 | Hobson | ............. | 280/47.25 |
| D302,887 S * | 8/1989 | Ackerfeldt | ............. | D34/15 |
| 4,865,346 A * | 9/1989 | Carlile | ............. | 280/654 |
| 4,887,835 A * | 12/1989 | Dallaire et al. | ............. | 280/646 |
| 4,889,267 A * | 12/1989 | Bolton | ............. | 224/274 |
| 5,362,079 A * | 11/1994 | Graham | ............. | 280/47.23 |
| 5,374,073 A * | 12/1994 | Hung-Hsin | ............. | 280/30 |
| 5,409,253 A * | 4/1995 | Cheng | ............. | 280/646 |
| 5,439,241 A * | 8/1995 | Nelson | ............. | 280/645 |
| 5,451,072 A * | 9/1995 | Weng | ............. | 280/646 |
| 5,526,894 A * | 6/1996 | Wang | ............. | 180/65.1 |
| 5,752,634 A * | 5/1998 | Kortman | ............. | 224/274 |
| 5,769,194 A * | 6/1998 | Chang | ............. | 190/18 A |
| 5,797,617 A * | 8/1998 | Lin | ............. | 280/655 |
| 5,799,958 A * | 9/1998 | Bishop | ............. | 280/47.26 |
| 5,836,601 A * | 11/1998 | Nelson | ............. | 280/645 |
| 5,863,055 A * | 1/1999 | Kasravi et al. | ............. | 280/47.29 |
| 5,967,544 A * | 10/1999 | Kanta | ............. | 280/652 |
| 5,971,409 A * | 10/1999 | Butz | ............. | 280/47.26 |
| 6,123,344 A * | 9/2000 | Clegg | ............. | 280/47.19 |
| 6,131,925 A * | 10/2000 | Weldon | ............. | 280/30 |
| 6,149,168 A * | 11/2000 | Pauser et al. | ............. | 280/47.371 |
| 6,237,734 B1 * | 5/2001 | Chen | ............. | 190/18 A |
| 6,425,724 B1 * | 7/2002 | Williamson | ............. | 414/490 |

(Continued)

*Primary Examiner* — J. Allen Shriver, II
*Assistant Examiner* — Brodie Follman
(74) *Attorney, Agent, or Firm* — William B. Noll

(57) ABSTRACT

A wheeled and collapsible disc golf caddy system to facilitate the pleasure of playing a game of disc golf. The system comprises an elongated frame member mounting a handle at one end thereof for towing the system behind the user thereof. Intermediate the frame member is a pair of collapsible wheels for easy transportation. The remote end of the frame member mounts a pivotal rim for removably receiving a drink containing chest that can be removably secured to the frame member by means such as VELCRO fastening members. Additionally, the system includes a housing, preferably U-shaped, mounted to the frame member and containing plural shelves for storing a variety of discs.

5 Claims, 5 Drawing Sheets

U.S. PATENT DOCUMENTS

| | | | |
|---|---|---|---|
| 6,520,514 B2* | 2/2003 | Clegg | 280/47.26 |
| 6,550,860 B2* | 4/2003 | Lombardi | 297/217.1 |
| 6,561,528 B2* | 5/2003 | Bootsman | 280/47.26 |
| 6,883,824 B2* | 4/2005 | Yang | 280/646 |
| 7,066,476 B2* | 6/2006 | Elden | 280/37 |
| 7,246,805 B2* | 7/2007 | Neal et al. | 280/35 |
| 7,500,681 B2* | 3/2009 | Steadman | 280/47.131 |
| 7,703,776 B1* | 4/2010 | Nugent | 280/47.26 |
| 7,832,557 B2* | 11/2010 | Amin | 206/315.5 |
| 7,857,328 B1* | 12/2010 | Boss | 280/47.25 |
| 7,874,563 B2* | 1/2011 | Mims | 280/47.38 |
| 2002/0024272 A1* | 2/2002 | Eschenfelder | 312/100 |
| 2002/0105156 A1* | 8/2002 | Glidden | 280/47.19 |
| 2003/0141687 A1* | 7/2003 | Wixted et al. | 280/47.35 |
| 2004/0056440 A1* | 3/2004 | Hathaway | 280/47.35 |
| 2004/0211687 A1* | 10/2004 | Rodriguez | 206/315.3 |
| 2006/0243768 A1* | 11/2006 | Dowell | 224/400 |
| 2007/0029746 A1* | 2/2007 | Brennan | 280/47.26 |
| 2007/0267454 A1* | 11/2007 | Baiz | 224/901.8 |
| 2008/0042382 A1* | 2/2008 | Dodier et al. | 280/47.26 |
| 2008/0217193 A1* | 9/2008 | Amin | 206/315.5 |
| 2009/0096181 A1* | 4/2009 | Cole et al. | 280/47.35 |
| 2010/0237576 A1* | 9/2010 | Maccario | 280/47.26 |

* cited by examiner

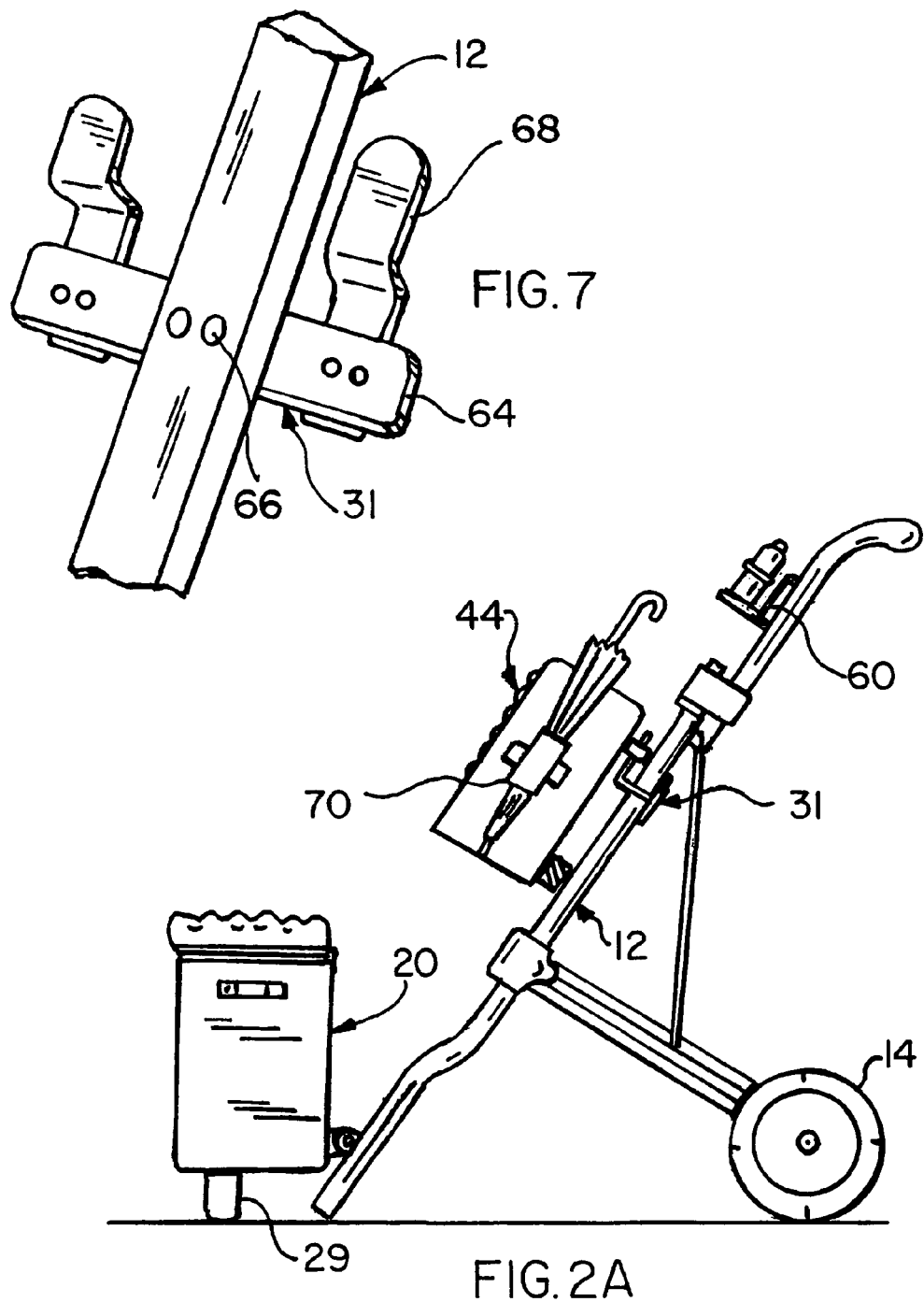

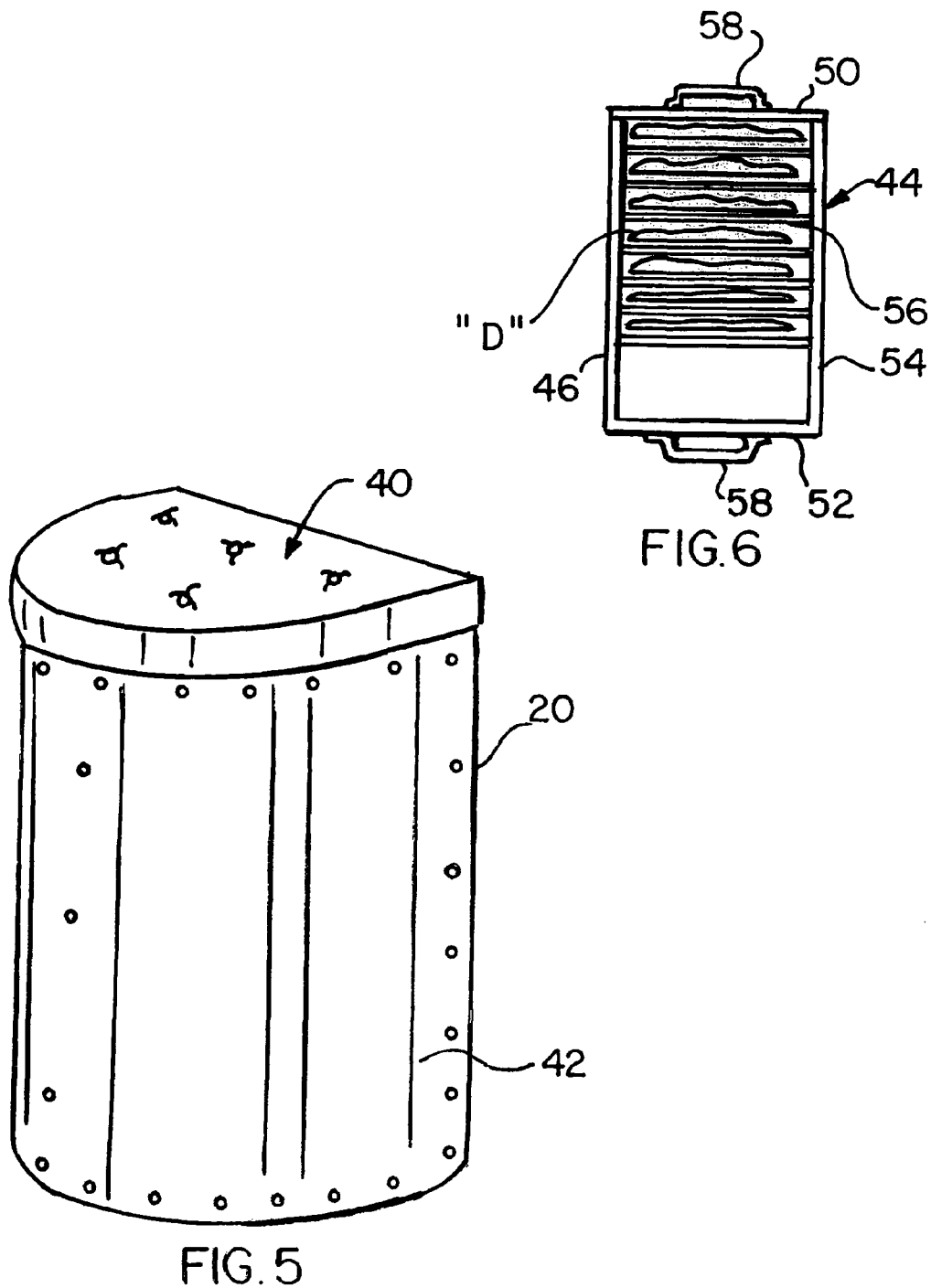

DISC GOLF CADDY

FIELD OF THE INVENTION

This invention is directed to the field of outdoor sports equipment, more particularly to a disc golf caddy or equipment carrier that may double as a temporary seat during a round of disc golf.

BACKGROUND OF THE INVENTION

The present invention relates to a wheeled caddy for transporting playing implements and accessories for a game of disc golf, or frisbee golf. Disc golf is similar to traditional golf, except that the player uses plastic flying discs, thrown by the player to an above ground target, which is sometimes called a basket or cage. The object of the game is to throw a golf disc into the target in the fewest number of throws. The player begins by 'driving' from a designated tee area and continues toward the target, throwing each subsequent shot from the spot where the previous throw has landed. Finally, a successful 'putt' sends the disc into the target. A disc golf course typically contains 18 to 24 holes that may vary in length form 150 to 500 feet.

The popularity of disc golf has grown dramatically over the last several years, and there are a number of disc golf equipment and accessories that have been patented, as reflected in the following U.S. patents, where such patents may help the reader to better understand the game of disc golf:

1. U.S. Pat. No. 6,494,455, to Headrick, teaches a pole mounted basket and chain assembly for use with flying disc golf courses.
2. U.S. Pat. No. 6,705,654, to Slauf, covers a fold-up golf disc retriever.
3. U.S. Pat. No. 6,776,417, to Holgate, relates to a disc golf target designed to provide more consistent disc capture.
4. U.S. Pat. No. 6,887,119, to Bloeme et al., is directed to a low profile flying disc.
5. U.S. Pat. No. 7,081,032, to Holgate, teaches a flying disc with plural hand gripping positions.
6. U.S. Pat. No. 7,101,293, to Tarng et al. covers a general description of the game of disc golf.

Like conventional golf, the pleasure of a round of golf can be enhanced by the use of transportation in the form of a golf cart or pull cart for storing the golf clubs and related items. However, due to the uniqueness of the game of disc golf, no convenient means have been developed to assist the players throughout the round over the many 'holes'. There have been attempts to provide assistance to different sporting enthusiasts in the way of wheeled vehicles to carry equipment for the desired game. Several of such vehicles may be found in the following U.S. patents:

a.) U.S. Pat. No. 4,550,930, to Proffit, relates to a two-wheeled cart incorporating an upstanding frame and includes a lower horizontal platform projecting rearward of the frame for supporting a golf bag, and an upper forwardly projecting retractable handle assembly. Opposite side portions of the cart support swingably retractable horizontal supports and one of the supports is designed to have a cooler supported therefrom while the other support mounts a seat cushion. The handle of the cart includes a ball carrier as well as score pad and golf tee support structure and one wheel of the cart includes a resettable distance traveled indicator while the other wheel is axially adjustable relative to the cart.

b.) U.S. Pat. No. 4,759,559, to Moulton, is directed to an article carrier having a support shaft with a grasping area at one end and a pair of support legs pivotally attached to another end of the support shaft such that in a first retracted position. The support legs extend up towards the grasping area and the carrier is usable as a cane and in a second extended position as the carrier is configured as an inverted "Y".

c.) U.S. Pat. No. 5,480,078, to Verrette et al., teaches a golf bag and accessory carrier that serves the utility of a golfer both in carrying his golf bag, carrying his accessories, providing a water resistant carrying compartment, a basket type storage area, a self righting liquid refreshment carrier and a golf ball holder. These structures are enabled while still fully enabling a folding function, to show the golf bag cart to be conveniently carried and stowed in the trunk or back seat of a car. The golf bag cart and accessory carrier provides a carriage and utility area wider than the golf bag being carried, both for stability and enhanced convenience.

d.) U.S. Pat. No. 6,685,214, to Gregory, covers a cart for transporting various articles, most particularly sporting goods such as ski and golf equipment, that folds into a compact package for storage including a handle folds down and a shelf that folds up and wheels that can be rotated so as to be aligned in a common plane against the frame of the cart.

e.) U.S. Pat. No. 7,040,635, to Remole, discloses a portable wheeled dolly for transporting a receptacle of articles, such as a quantity of baseballs to a practice field, where the dolly comprises a pair of spaced apart, elongated frame members, and a U-shaped handle engaging respective first ends of the frame members. Hingedly positioned along a midpoint of the frame members is a pivotal platform which functions as a transporting support surface for the receptacle, or as a seat in a static mode. A pair of wheels are provided in proximity to the second ends of the frame members, where the wheels are vertically spaced from the second ends to avoid ground contact in the static mode, but in rolling contact in the transporting mode.

The foregoing patents describe and illustrate different mechanisms that one might employ for use in a game of disc golf, but none teach the specific and complete package of a transporting/storing/seating arrangement for a disc golf aid. The manner by which the present invention achieves the goals hereof will become apparent in the description and drawings which follow.

SUMMARY OF THE INVENTION

This invention teaches a portable, wheeled disc golf caddy to facilitate the playing of disc golf, a sport that is gaining significant popularity. The game is played with plastic flying discs, where the player throws the disc to an above-ground target, and the player may employ different types of discs for different purposes. The basic frame for the disc golf caddy is similar to a conventional golf cart of the type to tote a bag of clubs, golf clubs, etc., where a typical frame is fabricated of 1" light weight aluminum tubing. However, the golf cart has been modified for the unique purposes herein of facilitating the pleasurable playing of disc golf. The modification includes a removable, open-sided disc holder, for the storing of throwing discs, preferably with a pair of handles, that is provided with plural shelves to accommodate a like plurality of discs. Additionally, the frame includes a pivotal seat/drink chest, positionable to an upright position when the frame is angled to the ground. The chest may be provided with a removable padded cover to expose a cavity for storing hot or cool drinks and snacks. When transporting the disc golf caddy, the seat/drink chest may be pivoted and removably secured to the frame, such as by the well known VELCRO fastening members, or by a bracket.

Accordingly, a feature of the invention is the provision of a uniquely constructed disc gold caddy for transporting, storing discs, and resting, that includes a removable, pivotal seat that can double as a drink and snack chest, and a removable open-sided disc holder capable of holding plural discs.

Another feature of the invention is a disc golf caddy that includes a pair of wheels to facilitate easy transportability of the caddy hereof about the course.

A further feature of this invention lies with the use of a removable, multi-disc holder that carries a pair of handles for easy storage away from the cart.

These and other features of the invention will become more apparent from the following description and accompanying drawings.

BRIEF DESCRIPTION OF DRAWINGS

FIG. 2A is a side view similar to FIG. 2 and showing several modifications thereto.

FIG. 5 is an enlarged perspective view of the combination seat/drink container for pivotal attachment to the caddy frame of this invention.

FIG. 6 is a front view of a removable, portable disc holder for the storage of plural throwing discs for the invention hereof.

FIG. 7 is an enlarged, partial perspective view of a modification for removably mounting a disc holder.

DETAILED DESCRIPTION OF PREFERRED EMBODIMENT

Figure 1:
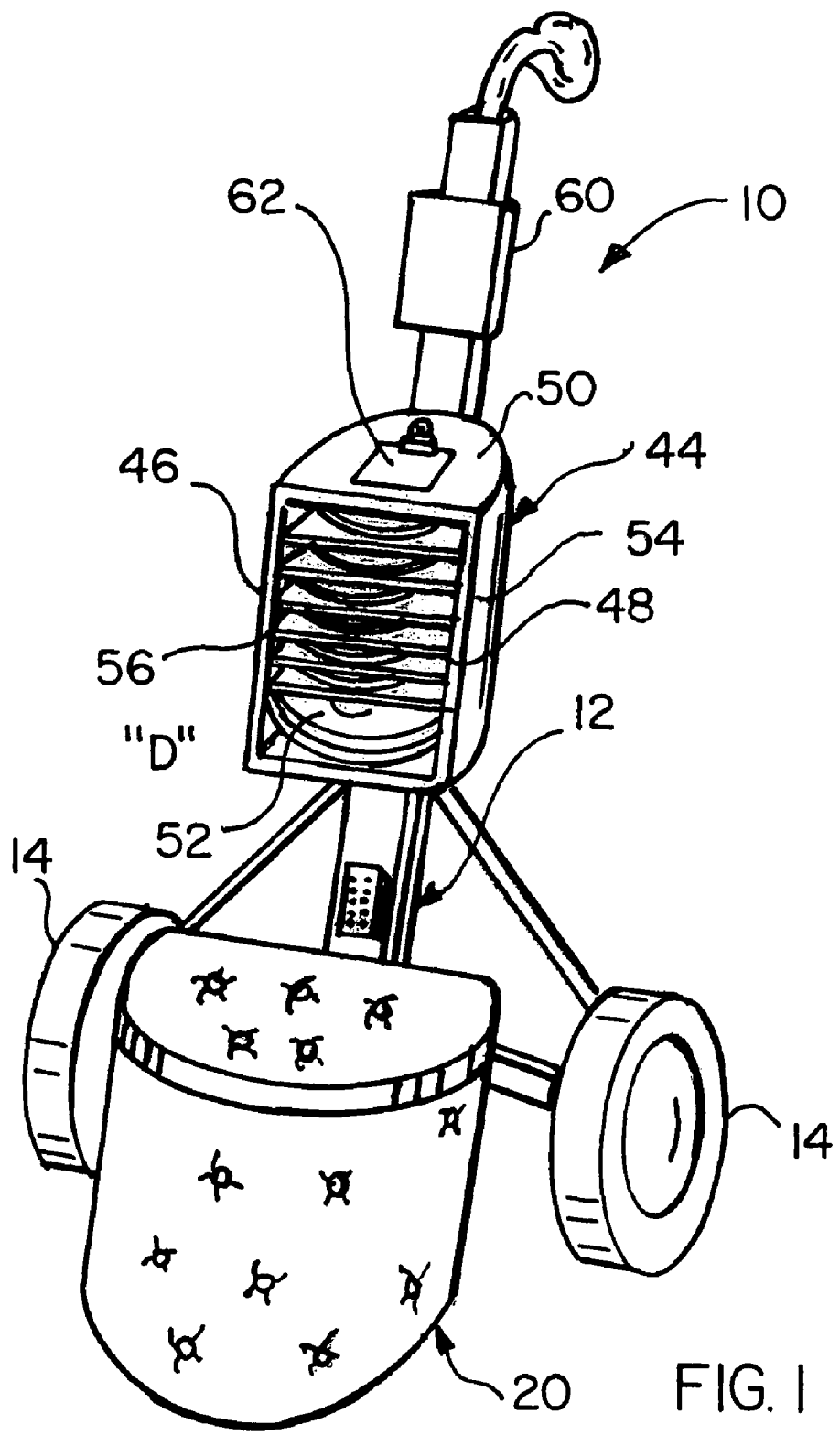
FIG. 1 is a perspective view of a preferred embodiment for the transportable disc golf caddy according to this invention.

This invention is directed to a uniquely designed and constructed disc golf caddy that is wheeled and mobile to allow the player to more easily enjoy the experience of playing disc golf. The invention will now be described with regard to the accompanying drawings, where like reference numeral represent like components or features throughout the several views.

Figure 2:
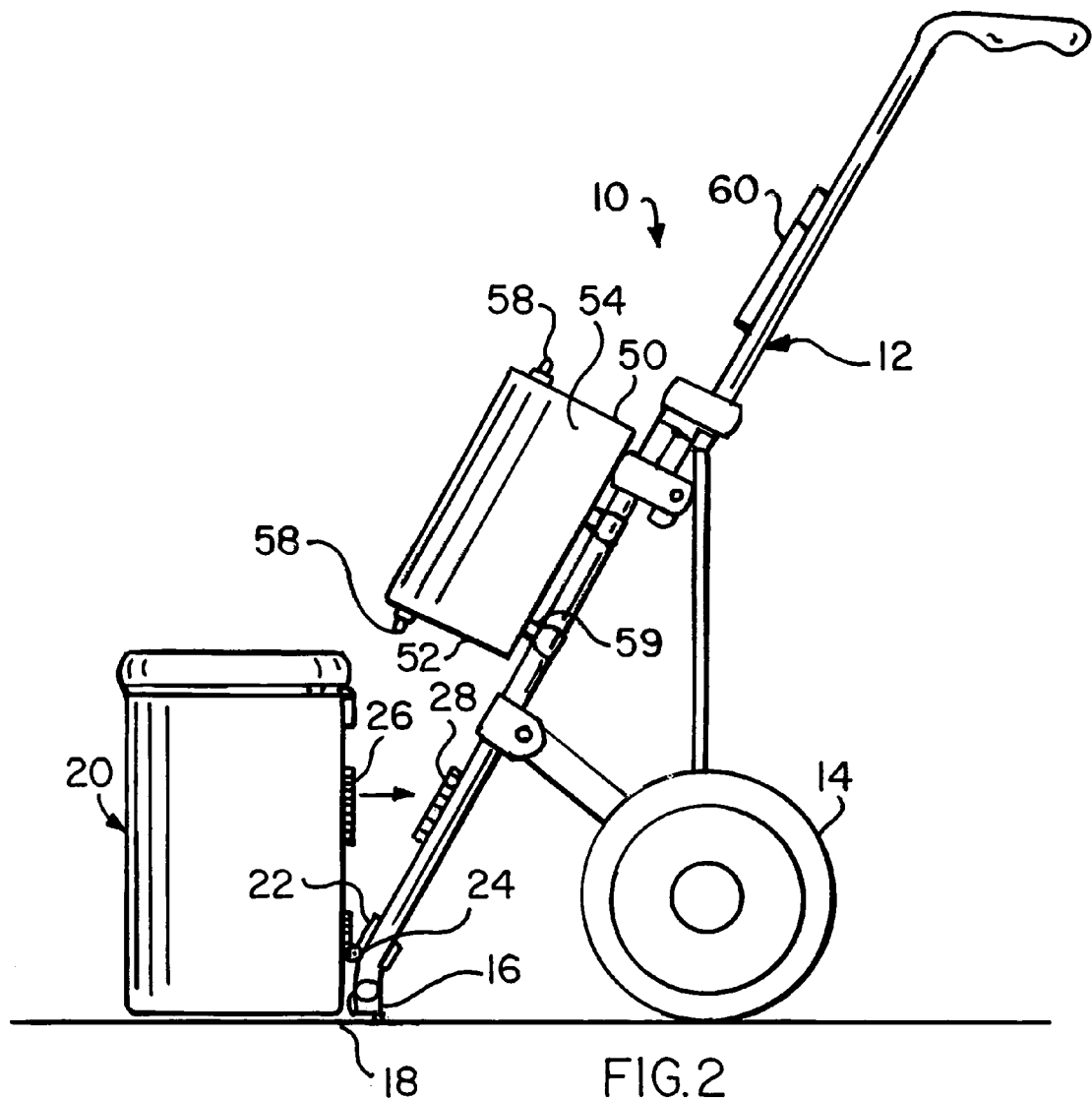
FIG. 2 is a side view of the transportable disc golf caddy of FIG. 1.

Turning now to the various Figures, FIGS. 1 and 2 illustrate a preferred embodiment for the disc golf caddy 10 according to this invention. The disc golf caddy 10 comprises a frame 12, where the support portions are preferably fabricated of aluminum tubing, such as 1" tubing, having a pair of wheels 14 adapted to be collapsed against the frame for storage, where such construction is known in the art for conventional golf carts. Greater details of the frame will be described later with regard to FIGS. 3 and 4. Returning to FIGS. 1 and 2, the base 16 includes a platform 18 upon which the seat/drink chest 20 may rest, where the seat/drink chest is further illustrated in FIG. 5, a removable hinge member 22, removable by releasable pin 24, and complementary VELCRO fasteners 26, 28, a trademark for a commercial hook and pile fastening system, for temporarily securing the seat/drink chest when mobile. When the player desires to sit while waiting for his next shot, the seat/drink chest 20 my be pivoted to the position illustrated in FIG. 2.

FIG. 2A illustrates a series of modifications to the disc gold caddy of FIGS. 1 and 2. Specifically, the seat/drink chest may include a downwardly extending leg 29 to further balance the seat/drink chest 20 when using same for a seat. Additionally, along with FIGS. 5 and 7, the portable disc holder 44 may be mounted by means of a bracket 31 to the frame 12, as discussed later.

Figure 3:
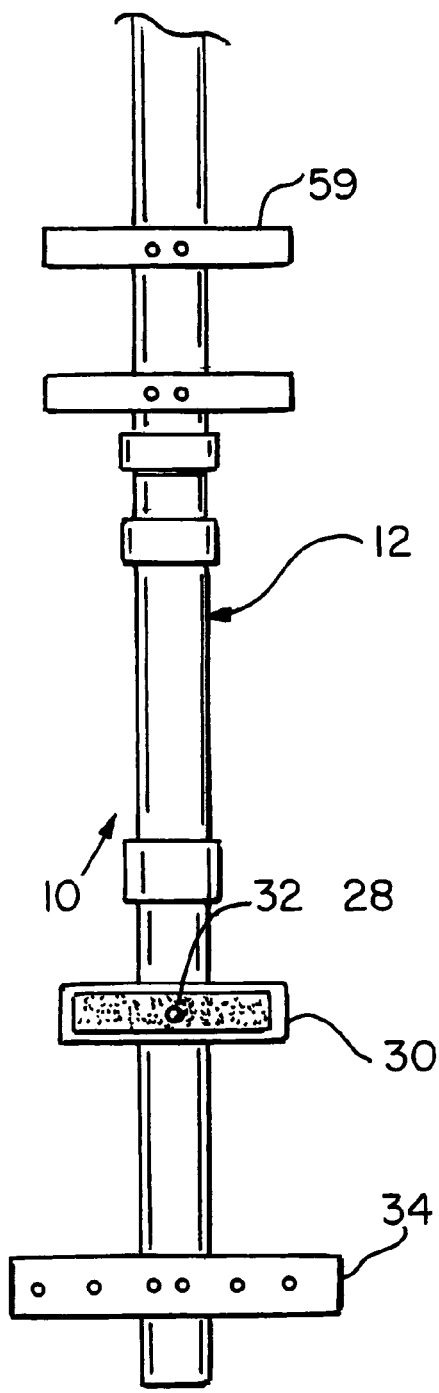
FIG. 3 is a partial front view of the caddy frame for supporting the respective components of the disc golf caddy of the invention.
Figure 4:
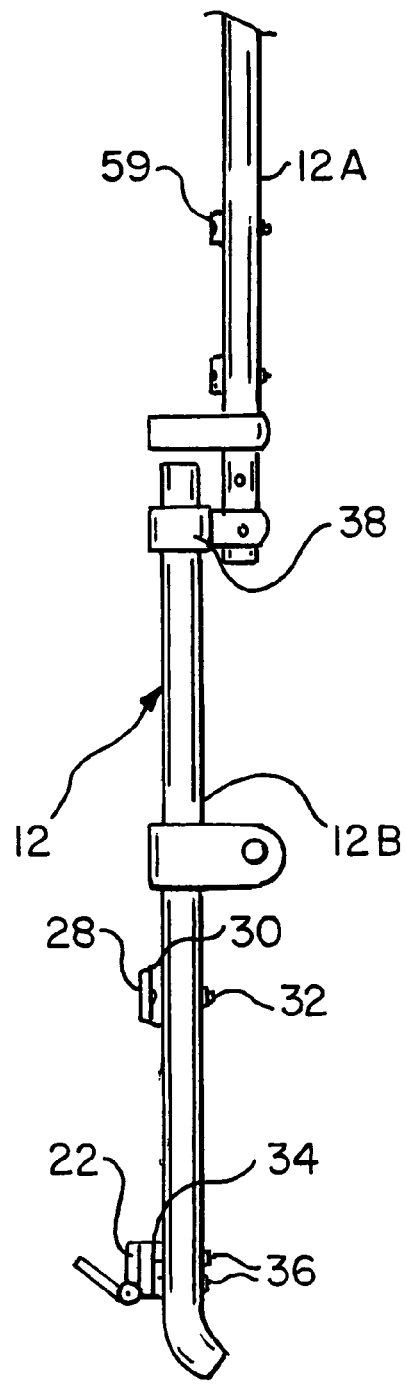
FIG. 4 is a side view of the caddy frame of FIG. 3.

FIGS. 3 and 4 illustrate further details of the frame 12. For example, the VELCRO fastener 28 may be mounted on a broad support 30 fixed to the frame 12 by fastener member 32 to provide greater securement of the seat/drink chest 20 during a mobile mode. Additionally, the removable hinge member 22 may be mounted to an intermediate support 34, and fixed to the frame by fastening members 36. Finally, as best seen in FIG. 4, the frame 12 is preferably adjustable through the use of a pair of members 12A, 12B, where member 12A mounts a sliding bracket 38 for fixing at selected heights. This allows the player to adjust the caddy height to a comfortable position for the player.

FIG. 5 shows an enlarged perspective view of the pivotal seat/drink chest 20. Preferably the top may be covered by a passed seat cushion 40, while the preferred curved outer wall 42 may be decoratively covered. Finally, to accommodate a variety of drinks, whether cold or hot, the wall structure is insulated by means known in the art.

Since the disc golf caddy is designed and constructed to facilitate the playing of disc golf, a portable disc holder 44 is removably mounted to the frame 12, see FIGS. 1, 2 and 6. The portable disc holder 44 comprises a housing 46, having an open side 48, preferably semi-circular top and bottom walls 50, 52 respectively, and a curved outer wall 54. Within the housing 46 is a series of spaced apart shelves 56, spaced apart a sufficient distance to accommodate plural plastic discs "D". The top and bottom walls 50, 52, respectively, may be provided with handles 58 to allow handling of the disc holder. Though not illustrated, an optional elastic strap may be provided to connect between the handles 58 and stretched over the open side 48 to protect the stored discs against falling out when traversing rough terrain. Further, the disc holder 44 may be removably fixed to the frame 12 by a variety of means, such as VELCRO fastener members, clips or other suitable fastening means, see FIGS. 3 and 4 showing mounting brackets 59.

FIGS. 2A and 7 illustrate an alternate manner of removably mounting the disc holder 44. Specifically, a horizontally disposed bar 64 may be secured to the frame 12 by fasteners 66, where the wings of the bar mount S-shaped hooking members 68 for receiving a complementary U-shaped bar on the rear of the disc holder. Note also, particularly in FIG. 6, a larger cavity may be provided at bottom of housing 46 where it may contain a sliding drawer to contain personal items, such as wallet, jewelry, money, etc. The frame may be further modified by the inclusion of a drink holder 60, as best seen in FIG. 2A, and a score keeping base 62 (FIG. 1). While other items may be stored on the disc golf caddy, one item may be the inclusion of a tubular member 70 (FIG. 2A) or bracket to store an umbrella.

It is recognized that changes, variations and modifications may be made to the disc golf caddy of this invention, particularly by those skilled in the art. Accordingly, no limitation is intended to be imposed thereon except as set forth in the accompanying claims.

I claim:

1. A wheeled, collapsible disc golf caddy system to facilitate the playing of a game of disc golf, said system comprising:

a towable, upright and collapsible frame having a gripping handle and a pair of wheels for the ease of transporting the caddy system, said frame further including an upright frame member extending between said handle and said wheels, a pivotal base mounted at the remote end of said frame member, a drink containing chest for seating on said base, where the chest includes a movable top for accessing the interior of said chest, said movable top to allow seating by the user thereof, a pivotal hinge connected to said chest to facilitate pivoting of said chest into contact with said frame member, including means to removably secure said chest against said frame member, and an open-sided disc holder mounted on said frame member above said chest; wherein said disc holder is a generally U-shaped housing having an open face and containing plural spaced apart shelves for storing a variety of discs.

2. The wheeled, collapsible disc golf caddy system according to claim 1, wherein said U-shaped housing is secured to said frame member by a pair of brackets, slidable along selected positions.

3. The wheeled, collapsible disc golf caddy system according to claim 1, wherein said means for removably securing said chest to said frame member is a hook and pile type fastening member.

4. The wheeled, collapsible disc golf caddy system according to claim 1, wherein said drink containing chest is U-shaped having a flat wall and a circular wall connected thereto, where the flat wall has an upper edge mounting at least one hinge to which is joined said movable top.

5. The wheeled, collapsible disc golf caddy system according to claim 4, wherein said drink containing chest is pivotal from a storage position in contact with said frame member to a released position for seating by the user thereof.

* * * * *